UNITED STATES PATENT OFFICE.

LUCIEN ALFRED WILHELMINE DESRUELLES, OF PARIS, FRANCE.

PROTECTIVE COATING FOR THE ELECTRODES OF BATTERIES.

SPECIFICATION forming part of Letters Patent No. 350,297, dated October 5, 1886.

Application filed April 21, 1886. Serial No. 199,720. (No specimens.)

*To all whom it may concern:*

Be it known that I, LUCIEN ALFRED WILHELMINE DESRUELLES, a citizen of the Republic of France, residing in Paris, France, have invented a new and useful Protective Coating for the Electrodes of Batteries, of which the following is a specification.

The object of my invention is to prevent the too rapid wearing away or corrosion of the soluble electrodes of batteries when the circuit is open; and this object I attain by coating the electrode with a substance which I term "hydrargèrine."

This coating which I employ is composed of any grease or fat, preferably a mineral grease pounded or crushed with metallic mercury. This mercury may or may not contain, in the condition of amalgam, a certain proportion of a metal, the same as or analogous to that of which the soluble electrode to be coated is composed. As an example, I may make a coating composed of one hundred grams of tallow, twenty-five grams of paraffine, and three hundred grams of mercury ground or pounded and thoroughly mixed together. Such a coating applied to the surface of the zinc or other soluble electrode protects the latter from corrosion while the circuit is left open, and when the circuit is closed the coating which protects the zinc does not interfere with the action of the battery, for it possesses very little electrical resistance.

I claim as my invention—

1. The herein-described compound for coating battery-electrodes, said compound consisting of a fatty substance mixed with mercury.

2. A soluble electrode for a battery having a protective coating composed of a mixture of a fatty substance and mercury.

In testimony whereof I have signed my name to this specification in the presence of two subscribing witnesses.

LUCIEN ALFRED WILHELMINE DESRUELLES.

Witnesses:
 LÉON FRANCKEN,
 ROBT. M. HOOPER.